(12) United States Patent
Zappa et al.

(10) Patent No.: US 10,620,617 B2
(45) Date of Patent: Apr. 14, 2020

(54) METHOD OF MAINTENANCE OF AN ELECTROMECHANICAL DEVICE

(71) Applicant: WITTUR HOLDING GMBH, Wiedenzhausen (DE)

(72) Inventors: Roberto Zappa, Wiedenzhausen (DE); Giuseppe De Francesco, Wiedenzhausen (DE)

(73) Assignee: WITTUR HOLDING GMBH, Wiedenzhausen (DE)

( * ) Notice: Subject to any disclaimer, the term of this patent is extended or adjusted under 35 U.S.C. 154(b) by 0 days.

(21) Appl. No.: 15/768,210

(22) PCT Filed: Oct. 13, 2016

(86) PCT No.: PCT/IB2016/056122
§ 371 (c)(1),
(2) Date: Apr. 13, 2018

(87) PCT Pub. No.: WO2017/064637
PCT Pub. Date: Apr. 20, 2017

(65) Prior Publication Data
US 2018/0299876 A1    Oct. 18, 2018

(30) Foreign Application Priority Data

Oct. 13, 2015   (IT) ................. 102015000061162

(51) Int. Cl.
*G05B 23/02* (2006.01)
(52) U.S. Cl.
CPC ............ *G05B 23/0216* (2013.01); *G05B 2219/24086* (2013.01); *G05B 2219/2659* (2013.01); *G05B 2219/32014* (2013.01)

(58) Field of Classification Search
None
See application file for complete search history.

(56) References Cited

U.S. PATENT DOCUMENTS 9,558,592 B2 *   1/2017   Mullins ................. G06T 19/006
9,626,801 B2 *   4/2017   Mullins ................. G06T 19/006
(Continued)

FOREIGN PATENT DOCUMENTS

WO        2014141100 A1    9/2014

OTHER PUBLICATIONS

PCT/IB2016/056122 International Search Report dated Oct. 4, 2017.

*Primary Examiner* — Chico A Foxx
(74) *Attorney, Agent, or Firm* — Arent Fox LLP; Michael Fainberg

(57) ABSTRACT

A maintenance method of an electromechanical device comprises the steps of: —making available to a control unit of the electromechanical device data communication means based on a wireless communication protocol; —providing an operator a portable electronic device suitable to implement augmented reality and having a database in which is stored a list of maintenance operations that can be performed on the electromechanical device, —activating data communication between the electronic control unit and the portable electronic device and transferring from the first to the second the status signals and/or possible alarm signals; —in the presence of at least one alarm signal, correlating said alarm signal with at least one maintenance operation and communicating to the operator, thanks to augmented reality, the alarm signal and the maintenance operations related to said alarm signal.

12 Claims, 4 Drawing Sheets

(56) References Cited

U.S. PATENT DOCUMENTS

| | | | |
|---|---|---|---|
| 10,269,235 B2* | 4/2019 | Dayalan | G08B 25/14 |
| 2002/0191002 A1 | 12/2002 | Friedrich et al. | |
| 2006/0107785 A1* | 5/2006 | Zappa | B66B 13/20 |
| | | | 74/612 |
| 2006/0144646 A1 | 7/2006 | Engel et al. | |
| 2011/0115816 A1* | 5/2011 | Brackney | G06Q 10/06 |
| | | | 345/629 |
| 2013/0031202 A1* | 1/2013 | Mick | G06Q 10/06 |
| | | | 709/217 |
| 2013/0333983 A1* | 12/2013 | Zappa | B66B 13/08 |
| | | | 187/331 |
| 2015/0106710 A1* | 4/2015 | Dirschus | A61L 2/24 |
| | | | 715/708 |
| 2015/0188949 A1* | 7/2015 | Mahaffey | H04L 63/20 |
| | | | 726/1 |
| 2015/0339635 A1* | 11/2015 | Washiro | G06Q 10/20 |
| | | | 705/305 |
| 2016/0019212 A1* | 1/2016 | Soldani | G06F 16/434 |
| | | | 345/633 |
| 2016/0034761 A1* | 2/2016 | Frankel | G09G 5/003 |
| | | | 345/633 |
| 2016/0284073 A1* | 9/2016 | Michalscheck | G06T 7/001 |
| 2017/0091998 A1* | 3/2017 | Piccolo, III | G08B 13/00 |
| 2018/0058712 A1* | 3/2018 | Miyaura | F24F 11/30 |
| 2018/0307045 A1* | 10/2018 | Nishi | G02B 27/0172 |

* cited by examiner

METHOD OF MAINTENANCE OF AN ELECTROMECHANICAL DEVICE

CROSS-REFERENCE TO RELATED APPLICATIONS

This application is the U.S. National Stage Application of International Patent Application No. PCT/IB2016/056122, filed on Oct. 13, 2016, which claims priority to Italian Patent Application No. 102015000061162, filed on Oct. 13, 2015, the contents of each of which is incorporated herein by reference in its entirety.

This invention relates a method of maintenance of an electromechanical device with a control unit suitable to monitor the status of the device's operating parameters, for example to generate alarm signals in case of malfunction, and a portable electronic device suitable to implement this method.

SUMMARY

Advantageously, this invention applies in particular in situations where a maintenance intervention must be carried out on the site of use of the electromechanical device, or in any case, not at the production site where the device is manufactured.

In these cases, maintenance is performed using only the knowledge and experience of the operator who provides assistance, possibly giving the operator the ability to query, for example with a video conferencing service, his service or maintenance centre.

The purpose of this invention is to propose a maintenance method, and a portable electronic device suitable to implement such a maintenance method, which allow an operator, even if not particularly expert, to perform an effective and rapid maintenance operation.

Said purpose is achieved with a maintenance method according to claim 1 and with a portable electronic device according to claim 13. The dependent claims describe particularly advantageous preferred embodiments.

BRIEF DESCRIPTION OF THE DRAWINGS

Further details and advantages of the method and portable electronic device according to this invention will, in any case, be evident from the following description of preferred embodiments, provided by way of non-limiting example, with reference to the accompanying drawings, in which.

DETAILED DESCRIPTION

Figure 1:
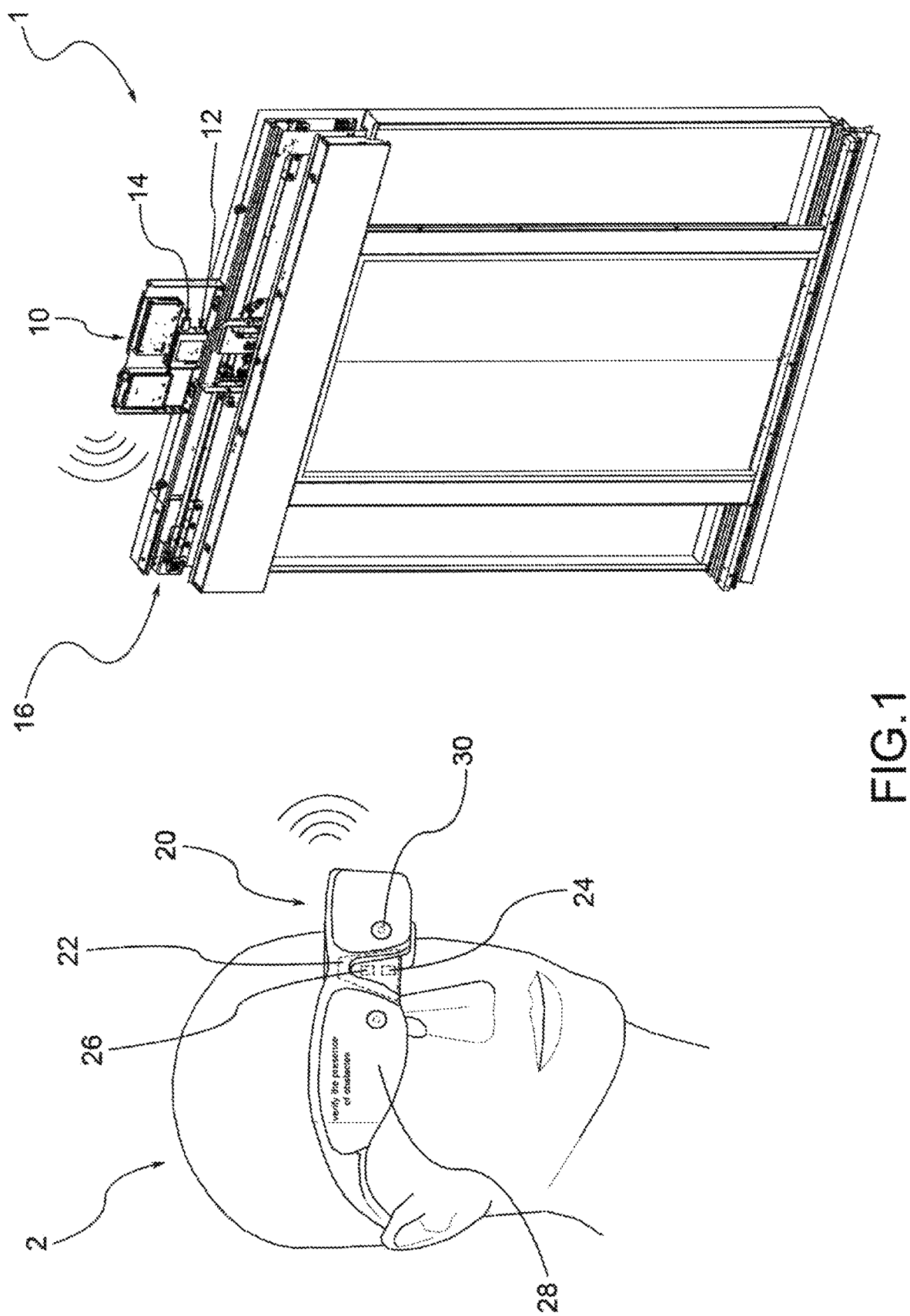
FIG. 1 schematically illustrates an example of a portable electronic device for the implementation of the maintenance method according to the invention and of an electromechanical device on which a maintenance intervention must be made.

The following description and, in particular, the examples and the accompanying figures, refer to maintenance interventions on electromechanical devices of an elevator. Of course, these are examples having a merely illustrative and purpose indicative of a possible practical application of the invention. The idea underlying this invention can be obviously applied to the most varied electromechanical devices, in particular to those for which it is not possible, or would be too difficult, to transport to a service centre or to the production site for maintenance.

The maintenance method is applicable to electromechanical devices 1 governed by an electronic control unit 10 suitable to monitor the status of operating parameters of the electromechanical device and possibly to generate alarm signals if the status of these parameters is not within a range of predetermined values.

In a preferred embodiment, the electronic control unit 10 is provided with a data output port 12 to which are sent alarm and/or status signals indicative of the status of the monitored parameters.

If not already provided, the maintenance method provides for connecting to the control unit 10, preferably to its data output port 12, data communication means 14 based on a wireless communication protocol, such as a dongle to implement a Bluetooth® communication protocol. Through such data communication means 14, the alarm and/or status signals can be transmitted to receiving means external to the electromechanical device 1.

The maintenance method also requires the supply of an operator 2 assigned to perform maintenance of the electromechanical device, or even a simple check of the operating status of the device, a portable electronic device 20 having a processing unit 22 provided with means of receiving data 24 based on a wireless communication protocol, such as the Bluetooth® protocol. In particular, such means of receiving data 24 are suitable to interact with the data communication means 14 of the control unit 10 of the electromechanical device 1 to receive from the latter the alarm and/or status signals.

The processing unit 22 is operatively connected to a database 26 in which is stored a list of maintenance operations that can be performed on the electromechanical device.

In a preferred embodiment, the database 26 is integrated in the portable electronic device 20 itself. For example, the database 26 is stored in a memory area of the processing unit.

The processing unit 22 is programmed to interpret each alarm signal received from the control unit 10 or to generate alarm signals on the basis of the status of the output signals, and to correlate each alarm signal received or generated with at least one of the maintenance operations included in the database. In other words, the processing unit 22 is able to interpret each alarm signal coming from the control unit 10 of the electromechanical device or to generate alarm signals itself if the status signals indicative of the operation of the electromechanical device are not consistent with expected values, and to associate each of said alarm signals received and/or generated to at least one, preferably an ordered sequence, of the maintenance operations.

Additionally, the portable electronic device 20 includes an operator interface 28 operatively connected to the processing unit 22.

The maintenance method thus requires activating a data communication between the electronic control unit 10 of the electromechanical device 1 and the processing unit 22 of the portable electronic device 20 and transferring from the first to the second any alarm and/or status signals.

In the presence of at least one alarm signal received or generated, the processing unit 22 correlates this alarm signal with at least one maintenance operation and communicates to the operator, through the operator interface 28, the presence and type of alarm signal and the maintenance operations correlated to it.

In a preferred embodiment, at least some alarm signals are associated to several possible maintenance operations. These operations are, for example, classified on the basis of a criterion of probability of resolving the problem that caused the alarm. For example, the probability criterion is derived from the experience gained in the field in relation to the resolution of problems that have caused a certain alarm signal.

Therefore, the processing unit 22 suggests to the operator one or more maintenance operations to be performed on the electromechanical device.

In an embodiment, in the case of multiple maintenance operations correlated to an alarm signal, the processing unit 22 waits for the operator to perform the first that it suggested. If the problem that generated the alarm is resolved, the maintenance method can end. Otherwise, the processing unit 22 proposes to the operator a second maintenance operation and, possibly, if even this was not successful, subsequent operations to be performed.

In an embodiment, the processing unit 22 recognises whether or not the problem has been resolved through an update of the status of the alarm and/or status signals transmitted by the control unit 10 of the electromechanical device. This update can occur automatically, for example in response to a control signal that changes the status upon each intervention performed on the electromechanical device, or it can be commanded by the operator.

In an embodiment variant, it is the operator himself who, through the operator interface 28, communicates to the processing unit the outcome of the maintenance that was suggested.

In an embodiment, the method provides for, in the event of failure of all the suggested maintenance operations, a call to a remote service centre.

In an embodiment, the operator interface 28 comprises a screen suitable to allow a visualisation of at least the alarm signals and maintenance operations correlated to them.

In an embodiment, the portable electronic device 20 has a technology suitable to implement so-called augmented reality. In particular, the operator interface enables the operator to focus with a video or photo camera 30 on at least a part of the electromechanical device 1 and to view superimposed on the screen and in real-time a representation of what is focused on and the information received from the processing unit.

For example, the portable electronic device 20 can be implemented by a pair of augmented reality eyeglasses (as shown in FIG. 1), or by a tablet, smartphone and the like.

According to an embodiment that provides for the use of a photo or video camera 30 to focus on the electromechanical device, the portable electronic device 20 is suitable to implement an image recognition algorithm. Through this algorithm, the activation of communication between the electromechanical device and the portable electronic device can occur automatically when the portable electronic device focuses on the electromechanical device.

In an embodiment variant, the activation of communication occurs as a result of a command or an action performed by the operator.

For example, the operator can bring the portable device close to the electromechanical device and scan a bar code on the electromechanical device.

In an embodiment, the database 26 operatively connected to the processing unit 22 includes, for each electromechanical device that can be subjected to maintenance, a number of parameters which identify the operation and status which said parameters may assume in a situation of correct operation of the electromechanical device.

Independently of the manner with which communication is activated between the two devices, in an embodiment, upon activation of the communication between the electromechanical device and the portable electronic device, the processing unit 22 recognises the model of the electromechanical device, compares the status signals received from the control unit with the values of the status parameters relative to said device model and, in case of a status signal having a value outside a predetermined range of values of said status parameter, generates an alarm signal.

In some embodiments, the status signals are supplied to the control unit 10, and thus to the processing unit 22, possibly also to be displayed by the operator interface 28, by specific sensors with which the electromechanical device is provided. For example, such sensors comprise temperature sensors suitable to detect the temperature of the motor in case of overheating, counters suitable to detect the number of opening/closing cycles, pressure sensors to compensate for the stack effect inside the elevator shaft and vibration sensors to measure the level of comfort inside the cabin during normal use.

In some embodiments, the processing unit 22 is suitable to display on the operator interface 28 photographs and/or videos, in particular to help the operator in the performance of maintenance operations depending on the type of signals coming from the control unit 10.

In some embodiments, the processing unit 22 is suitable to display on the operator interface 28 wiring diagrams for connecting separate electrical parts of the electromechanical device and to highlight any incorrect wiring.

In some embodiments, the processing unit 22 is suitable to display on the operator interface 28 the operating parameters of the electromechanical device received from the control unit 10.

In some embodiments, in response to signals received from the control unit, the processing unit 22 is suitable to display on the operator interface 28 new values to set for operating parameters of the electromechanical device. For example, the operating parameters of the door can be modified, such as, for example, the speed profiles of the opening/closing of the car doors, the set-up of parameters related to the door or the entire system (for example the parameters of the glass doors, the reference standard based on the country of installation, settings for automatic reopening, settings for manual opening, etc.).

In an embodiment, the values of the new parameters can also be saved directly to an external archive, such as a cloud system, in order to archive the reference values for each individual system. For this purpose, the portable electronic device can be equipped with a GPS module in order to geo-localise the system during archiving of the data). This system also allows monitoring and maintaining statistics on registered systems.

Communication between the control unit 10 and the processing unit 22 can also be useful for checking any firmware updates of the control unit following regulatory updates or improvements made by the manufacturer of the electromechanical device.

In case of malfunctions of components to be replaced following breakage/wear it is possible, by means of an internet connection of the processing unit 22, to identify and order the code of the component to be replaced through an e-commerce service.

We will now describe some examples of maintenance algorithms implemented by the processing unit 22 of the portable electronic device 20 for performing maintenance on electromechanical devices of an elevator, in particular on the motor apparatus 16 that controls the opening/closing of the doors.

Figure 2:
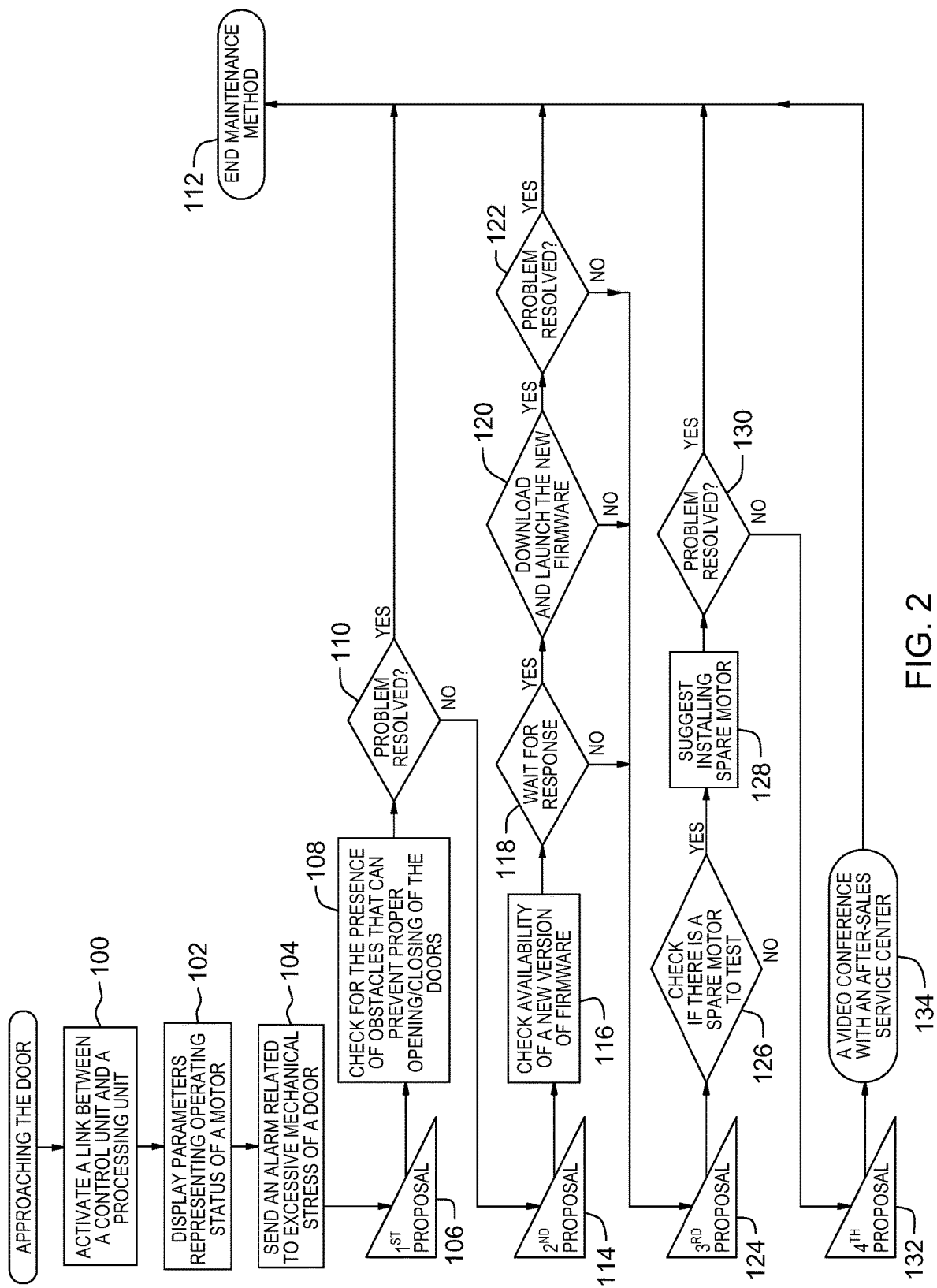
FIGS. 2 to 4 represent some maintenance algorithms.

In a first example shown in FIG. 2, following the approach of the operator to the elevator, the communication link is activated between the control unit that governs the motor apparatus for opening and closing the doors and the processing unit of the portable electronic device with which the operator is provided (step 100). The main parameters representing the operating status of the motor are displayed on the screen of the portable device (step 102). For example, such parameters include motor temperature, current absorption, the self-learning space, the space and times of the last opening/closing, the status of inputs/outputs, the model of slide and lock installed, the motor model, the set speed profile, the estimated moving mass, etc.

The control unit also sends the processing unit an alarm (AL02) related to excessive mechanical stress of the door (step 104).

At this point, the processing unit of the portable electronic device implements its own maintenance algorithm by associating the alarm code received to a sequence of possible operations to be performed.

As a first proposal 106, the processing unit suggests checking for the presence of obstacles that can prevent proper opening/closing of the doors (step 108). The processing unit then waits to know if the problem is resolved (step 110).

If yes, the maintenance method ends (step 112).

If no, the processing unit presents a second proposal 114. The processing unit asks the operator to check the availability of a new version of firmware to be installed in the control unit memory (step 116) and waits for the response (step 118).

If there is a new firmware version, the processing unit asks the user if he wants to download and launch the new firmware version (step 120).

If the operator responds in the affirmative, the control unit waits to know if the problem is resolved (step 122). If yes, the maintenance method ends.

If no, the processing unit presents a third proposal 124. The processing unit asks if the operator if he has a spare motor to test (step 126). If yes, the processing unit suggests installing the spare motor (step 128) and waits to know if the problem is resolved (step 130). If yes, the maintenance method ends.

If no, the processing unit activates, as the last proposal 132, a video conference with an after-sales service centre (step 134). The maintenance method is concluded.

Figure 3:
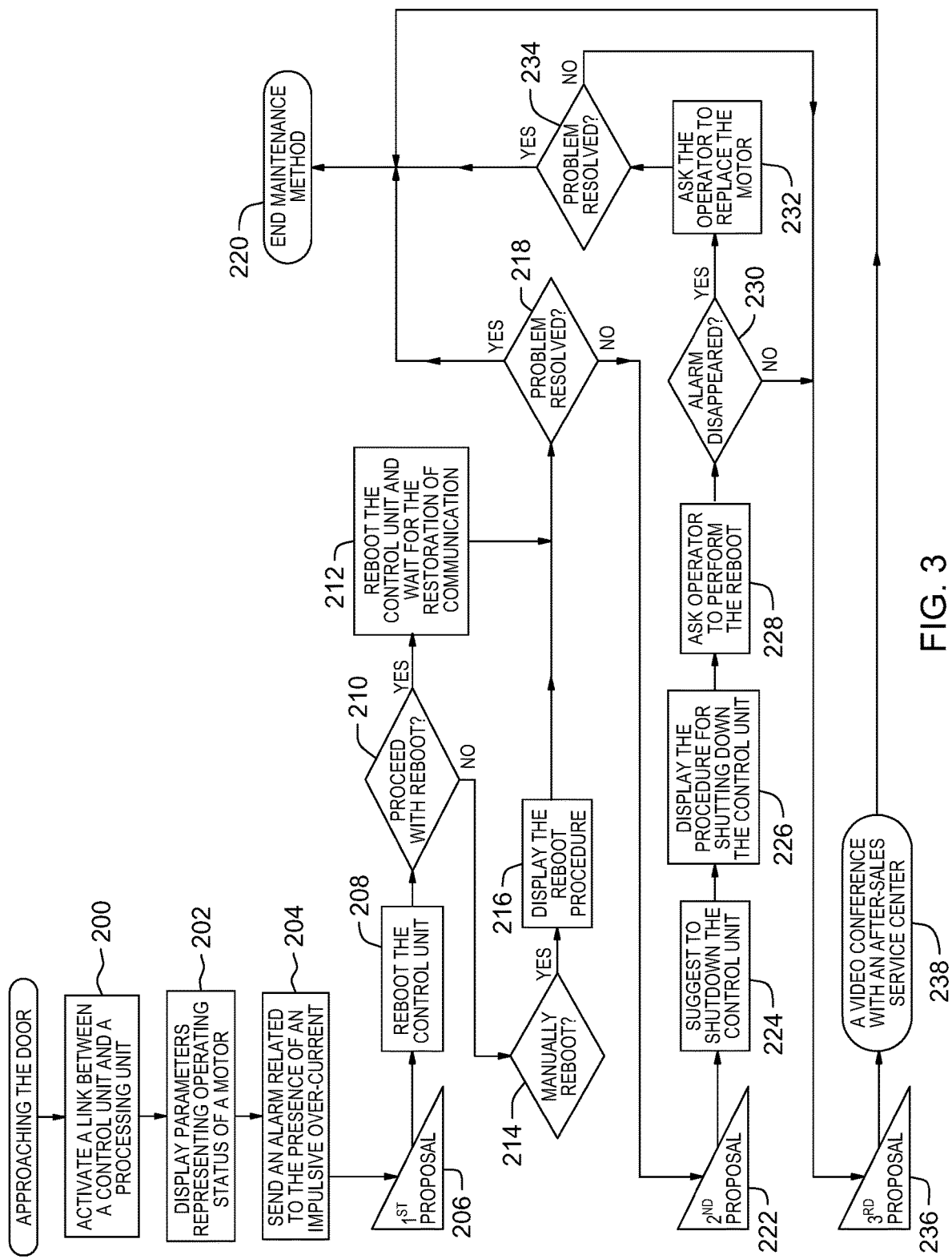

In a second example shown in FIG. 3, following the approach of the operator to the elevator, the communication link is activated between the control unit that governs the motor for opening and closing the doors and the processing unit of the portable electronic device with which the operator is provided (step 200). The main parameters representing the operating status of the motor are displayed on the screen of the portable device (step 202).

The control unit also sends the processing unit an alarm (AL09) relative to the presence of an impulsive over-current (step 204).

At this point, the processing unit of the portable electronic device implements its own maintenance algorithm by associating the alarm code received to a sequence of possible operations to be performed.

As a first proposal 206, the processing unit suggests rebooting the control unit (step 208). The processing unit asks if the operator if it should proceed with the reboot (step 210). If yes, the processing unit reboots the control unit and asks the operator to wait for the restoration of communication with the control unit (step 212). If no, the processing unit asks if the operator if he wants to perform a manual reboot (step 214). If yes, the processing unit shows the reboot procedure through a video or image sequence (step 216).

In both cases of rebooting, the processing unit then waits to know if the problem is resolved (step 218).

If yes, the maintenance method ends (step 220).

If no, the processing unit presents a second proposal 222. The processing unit suggests that the operator turn shutdown the control unit and disconnect both the encoder and the power cables (phase 224). The processing unit shows the procedure for shutting down and disconnecting the cables (step 226) and asks to perform the reboot of the control unit with the cables connected (step 228). The processing unit waits to know if the alarm AL09 has disappeared (step 230). If yes, the processing unit asks the operator to replace the motor (step 232) and waits to know if the problem is resolved (step 234).

If alarm AL09 is still present or the problem is not resolved, the processing unit activates, as the last proposal 236, a video conference with an after-sales service centre (step 238). The maintenance method is concluded.

Figure 4:
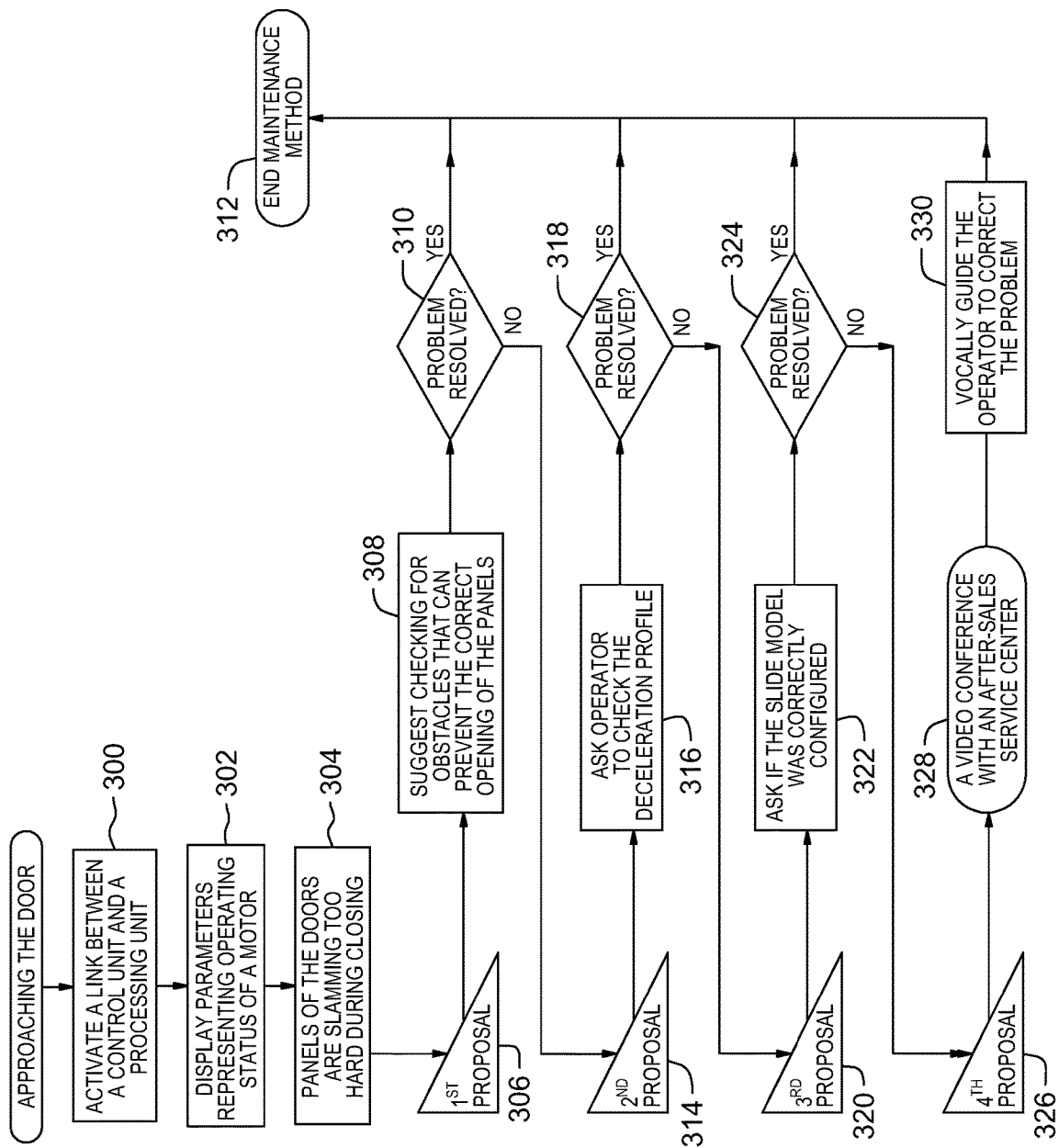

In a third example shown in FIG. 4, following the approach of the operator to the elevator, the communication link is activated between the control unit that governs the motor for opening and closing the doors and the processing unit of the portable electronic device with which the operator is provided (step 300). The main parameters representing the operating status of the motor are displayed on the screen of the portable device (step 302).

In this case, the control unit is not sending an alarm to the processing unit, but the panels of the doors are slamming too hard during closing (step 304).

The processing unit realises that the parameter relating to the self-learning distance is not consistent with the parameter relating to the last opening and, as a first proposal 306, it suggests checking for obstacles that can prevent the correct opening of the panels in particular in the groove of the threshold (step 308). The processing unit then waits to know if the problem is resolved (step 310).

If yes, the maintenance method ends (step 312).

If no, the processing unit presents a second proposal 314. The processing unit asks the operator to check the deceleration profile (step 316) and waits to know if the problem is resolved (step 318). If yes, the maintenance method ends.

If no, the processing unit presents a third proposal 320. The processing unit asks the operator if the slide model was correctly configured (step 322) and waits to know if the problem is resolved (step 324). If yes, the maintenance method ends.

If no, the processing unit activates, as the last proposal 326, a video conference with an after-sales service centre (step 328). For example, an after-sales service employee realises, the video camera of the portable electronic device, that the release plate of the slide is positioned incorrectly. The employee can highlight the component that needs to be adjusted and vocally guide the operator in performing the operation (step 330).

The maintenance method is concluded.

To the embodiments of the maintenance method and related portable electronic device according to the invention, a man skilled in the art, to satisfy contingent requirements, may make modifications, adaptations and replacements of members with others functionally equivalent, without departing from the scope of the following claims. Each of the characteristics described as belonging to a possible embodiment can be achieved independently from the other embodiments described.

The invention claimed is:

1. A method of maintenance of an electromechanical device, wherein said electromechanical device is controlled by an electronic control unit suitable to monitor a status of operating parameters of the electromechanical device and to carry to a data output port of said electronic control unit, status signals indicative of the state of said operating parameters and/or alarm signals if the state of said parameters is not within a predetermined range, wherein the electronic control unit comprises a control unit data communication means in communication with the output port, the method comprising the steps of:

making available to the control unit data communication means based on a wireless communications protocol, to enable transmission to a portable electronic device external to the electromechanical device, said status signals and/or alarm signals;

wherein the portable device comprises a processing unit provided with means for receiving data;

providing an operator with the portable electronic device, said processing unit being operatively connected to a database in which a list of maintenance operations executable on the electromechanical device is stored, said processing unit being further programmed to interpret any alarm signal received from the electronic control unit or to generate alarm signals on the basis of output signals status corresponding to the received data, and to correlate each alarm signal received or generated with at least one of said maintenance operations, the portable electronic device further comprising an operator interface operatively connected to the processing unit;

activating data communication between the electronic control unit and the processing unit and transferring from the electronic control unit to the processing unit the status signals and/or possible alarm signals;

if at least one alarm signal is present correlating, by means of the processing unit, said the at least one alarm signal with at least one maintenance operation and communicating to the operator, through the operator interface, said the at least one alarm signal and the at least one maintenance operation related to said alarm signal, wherein if one of said at least one maintenance operation is a reboot of the electronic control unit, asking the operator, by the processing unit if the processing unit should proceed with a reboot operation, and, in response to getting an affirmative response from the operator, rebooting, by the processing unit, the control unit and asking the operator to wait for restoration of communication between the processing unit and the control unit.

2. Method according to claim 1, wherein said operator interface comprises a screen suitable to allow visualisation of at least the alarm signals and of the maintenance operations related to them.

3. Method according to claim 2, wherein the operator interface enables the operator to focus on at least a part of the electromechanical device and to view superimposed on the screen and in real-time a representation of said part of the electromechanical device, and information received from the processing unit.

4. Method according to claim 1, wherein the portable electronic device is selected from a pair of glasses for augmented reality, a tablet, and a smartphone.

5. Method according to claim 1, wherein the step of correlating at least one maintenance operation with the at least one alarm signal comprises, in case of multiple maintenance operations, a classification of said operations on the basis of a criterion of a likelihood of resolving the at least one alarm.

6. Method according to claim 5, in which maintenance operations subsequent to a first maintenance operation are communicated to the operator as a result of the persistence of the at least one alarm signal at the end of performing a previous maintenance operation.

7. Method according to claim 3, wherein the portable electronic device is suitable to implement an algorithm of image recognition, and wherein the activation of the communication between the electromechanical device and the portable electronic device is automatic when said portable electronic device focuses on the electromechanical device.

8. Method according to claim 1, wherein the database operatively connected to the processing unit includes, for each electromechanical device to be subjected to maintenance, a number of parameters which identify the operation and status which said parameters may assume in a situation of correct operation of the electromechanical device.

9. Method of maintenance according to claim 8, wherein, upon activation of the communication between the electromechanical device and the portable electronic device, the processing unit recognises the model of a respective electromechanical device, compares the status signals received from a respective control unit with the values of the status parameters relative to said device model and, in case of a signal status having a value outside a predetermined range of values of said respective status parameter, generating an alarm signal.

10. Method according to claim 1, wherein said electromechanical device is a lift.

11. Method according to claim 1, wherein the control unit of the electromechanical device is provided with a data output port, and wherein the step of providing data communication means provides for connecting to said data output port an electronic communication device suitable to implement a short-range data communication protocol.

12. Portable electronic device configured to implement a method for the maintenance of an electromechanical device according to claim 1.

* * * * *